(12) United States Patent
Tian et al.

(10) Patent No.: US 12,549,104 B2
(45) Date of Patent: *Feb. 10, 2026

(54) POWER SOURCE SUPPLYING APPARATUS, CIRCUIT CONTROL METHOD, AND POWER SUPPLY SYSTEM

(71) Applicants: GUANGDONG OPPO MOBILE TELECOMMUNICATIONS CORP., LTD., Guangdong (CN); POWERLAND TECHNOLOGY INC., Jiangsu (CN)

(72) Inventors: Chen Tian, Guangdong (CN); Jialiang Zhang, Guangdong (CN); Jingpeng Zhu, Jiangsu (CN); Weiwei Lu, Jiangsu (CN); Juanjuan Sun, Jiangsu (CN); Julu Sun, Jiangsu (CN)

(73) Assignees: GUANGDONG OPPO MOBILE TELECOMMUNICATIONS CORP., LTD., Guangdong (CN); POWERLAND TECHNOLOGY INC., Jiangsu (CN)

( * ) Notice: Subject to any disclaimer, the term of this patent is extended or adjusted under 35 U.S.C. 154(b) by 356 days.

This patent is subject to a terminal disclaimer.

(21) Appl. No.: 18/316,227

(22) Filed: May 11, 2023

(65) Prior Publication Data
US 2023/0283185 A1    Sep. 7, 2023

Related U.S. Application Data

(63) Continuation of application No. PCT/CN2021/118072, filed on Sep. 13, 2021.

(30) Foreign Application Priority Data

Nov. 12, 2020 (CN) .......................... 202011262842.6

(51) Int. Cl.
*H02M 3/158* (2006.01)
*H02M 1/00* (2006.01)
(Continued)

(52) U.S. Cl.
CPC ........ *H02M 3/1582* (2013.01); *H02M 1/007* (2021.05); *H02M 1/143* (2013.01); *H02J 7/02* (2013.01)

(58) Field of Classification Search
CPC ........ H02J 7/345; H02M 1/007; H02M 1/008; H02M 1/14–15; H02M 3/158; H02M 3/33576; H02M 3/33592
See application file for complete search history.

(56) References Cited

U.S. PATENT DOCUMENTS 5,804,951 A    9/1998    Rivet
8,692,512 B2    4/2014    Tanikawa et al.
(Continued)

FOREIGN PATENT DOCUMENTS

CA    3034422    8/2019
CN    1521928    8/2004
(Continued)

OTHER PUBLICATIONS

CNIPA, Notification of Reexamination for CN Application No. 202011262842.6, May 6, 2023.
(Continued)

*Primary Examiner* — Thienvu V Tran
*Assistant Examiner* — Jennifer C Caulk
(74) *Attorney, Agent, or Firm* — Hodgson Russ LLP

(57) ABSTRACT

A power supply device, a circuit control method and a power supply system, belonging to the field of power supply conversion technologies. The power supply device can ensure that a second-stage conversion circuit has a sufficiently high valley voltage by means of a valley-fill circuit (Continued)

without using an electrolytic capacitor or other large-volume capacitors, thereby ensuring that the output voltage of the power supply device is overall stable. On the other hand, the power supply device can, by controlling the voltage of an energy storage unit, utilize the ability of the energy storage unit to store electric energy as far as possible whilst ensuring that the voltage does not exceed a specific voltage, so as to lower the requirements on the voltage resistance of the energy storage unit, thereby realizing the miniaturized design of the power supply device and improving the portability of the power supply device.

19 Claims, 5 Drawing Sheets

(51) Int. Cl.
*H02M 1/14* (2006.01)
*H02J 7/02* (2016.01)

(56) References Cited

U.S. PATENT DOCUMENTS

| | | | |
|---|---|---|---|
| 9,118,185 | B2 | 8/2015 | Von Novak et al. |
| 10,224,806 | B1 | 3/2019 | Lind |
| 2005/0270745 | A1* | 12/2005 | Chen .................. H01F 27/2804 361/707 |
| 2013/0187595 | A1* | 7/2013 | Bucher .................... H04B 5/79 320/108 |
| 2014/0301119 | A1* | 10/2014 | Chiang ............... H02M 7/4835 363/44 |
| 2016/0301316 | A1 | 10/2016 | Nielsen |
| 2017/0099710 | A1* | 4/2017 | Liu ......................... H02M 1/42 |
| 2017/0187217 | A1 | 6/2017 | Gong et al. |
| 2017/0294831 | A1 | 10/2017 | Dai et al. |
| 2018/0277999 | A1* | 9/2018 | Hayes .................. H01R 13/514 |

FOREIGN PATENT DOCUMENTS

| | | |
|---|---|---|
| CN | 103312144 | 9/2013 |
| CN | 103618461 | 3/2014 |
| CN | 204539569 | 8/2015 |
| CN | 106160479 | 11/2016 |
| CN | 107769304 | 3/2018 |
| CN | 109120156 | 1/2019 |
| CN | 109599924 | 4/2019 |
| CN | 109889062 | 6/2019 |
| CN | 110829557 | 2/2020 |
| CN | 111262420 | 6/2020 |
| CN | 111771326 | 10/2020 |
| CN | 112234848 | 1/2021 |
| CN | 112350567 | 2/2021 |
| CN | 112448601 | 3/2021 |
| EP | 3079252 | 10/2016 |
| EP | 3079252 A2 * | 10/2016 ........ H02M 3/33507 |
| EP | 2393181 | 9/2019 |
| WO | 2019158120 | 8/2019 |

OTHER PUBLICATIONS

Valipour, "Electrolytic Capacitor-Less AC-DC LED Driver with Constant Output Current and PFC," The 6th International Power Electronics Drive Systems and Technologies Conference (PEDSTC2015), Feb. 2015.
Fang et al., "Zero Ripple Single Stage AC-DC LED Driver with Unity Power Factor," IEEE Energy Conversion Congress and Exposition, Sep. 2013.
Ramakrishnareddy CH, "An efficient full-bridge resonant converter for light emitting diode (LED) application with simple current control," International Journal of Circuit Theory and Applications, Sep. 2019, vol. 47, No. 12.
EPO, Extended European Search Report for EP Application No. 21890797.0, Apr. 2, 2024.
CNIPA, First Office Action for CN Application No. 202011261778.X, Aug. 23, 2021.
CNIPA, Second Office Action for CN Application No. 202011261778.X, Feb. 7, 2022.
CNIPA, Rejection Decision for CN Application No. 202011261778.X, Aug. 2, 2022.
CNIPA, Notification of Reexamination for CN Application No. 202011261778.X, Apr. 12, 2023.
CNIPA, Review Decision Letter for CN Application No. 202011261778.X, May 29, 2023.
WIPO, International Search Report and Written Opinion for PCT/CN2021/114120, Nov. 9, 2021.
EPO, Extended European Search Report for EP Application No. 21890725.1, Mar. 4, 2024.
USPTO, Non-Final Office Action for U.S. Appl. No. 18/311,201, Mar. 11, 2025.
Uspto, Non-Final Office Action for U.S. Appl. No. 18/311,201, Jul. 29, 2025.
Cnipa, First Office Action for CN Application No. 202011262842.6, Aug. 3, 2021.
Cnipa, Second Office Action for CN Application No. 202011262842.6, Dec. 17, 2021.
Cnipa, Rejection Decision for CN Application No. 202011262842.6, Mar. 29, 2022.
WIPO, International Search Report and Written Opinion for PCT/CN2021/118072, Dec. 15, 2021.
CNIPA, Reexamination Notice for CN Application No. 202011262842.6, Mar. 8, 2023.

* cited by examiner

POWER SOURCE SUPPLYING APPARATUS, CIRCUIT CONTROL METHOD, AND POWER SUPPLY SYSTEM

CROSS-REFERENCE TO RELATED APPLICATIONS

This application is a continuation of International Application No. PCT/CN2021/118072, filed Sep. 13, 2021, which claims priority to Chinese Patent Application No. 202011262842.6, filed Nov. 12, 2020, the entire disclosures of which are incorporated herein by reference.

TECHNICAL FIELD

Embodiments of the disclosure relate to the field of power conversion technology, and in particularly to a power supply device, a circuit control method, and a power supply system.

BACKGROUND

Current technology has enabled electronic devices to provide increasing convenience in daily life. However, the need for frequent charging can be a hindrance to their use.

In the related art, power supply devices are bulky and inconvenient to carry, making it difficult to charge electronic devices on-the-go.

The above information disclosed in the background section is illustrative and is only intend to enhance understanding of the background of the disclosure and does not constitute prior art information that is already known to those skilled in the art.

SUMMARY

Embodiments of the disclosure provide a power supply device, a circuit control method, and a power supply device. The technical solutions are as follows.

According to an aspect of the disclosure, a power supply device is provided. The power supply device can include: an input rectifier circuit configured to convert a received alternating-current voltage into a first pulsating direct-current voltage; a first-stage conversion circuit connected to the input rectifier circuit, wherein the first-stage conversion circuit can be configured to convert the first pulsating direct-current voltage into a second pulsating direct-current voltage; a valley-fill circuit can include an energy storage unit and a first switch unit, wherein the first switch unit is connected to the first-stage conversion circuit and the energy storage unit, and the first switch unit is configured to switch on when the voltage of the energy storage unit is lower than a first voltage value, to thereby enable the energy storage unit obtains electrical power from the first-stage conversion circuit; the energy storage unit can be connected to the first-stage conversion circuit, and the energy storage unit is configured to supply electrical power when the voltage value of the first pulsating direct-current voltage is lower than a second voltage value, to increase a valley voltage of the first pulsating direct-current voltage; a second-stage conversion circuit can be connected to the first-stage conversion circuit, where the second-stage conversion circuit is configured to convert the second pulsating direct-current voltage into a constant direct-current voltage and output the constant direct-current voltage.

According to yet another aspect, a circuit control method is provided. According to an embodiment, the method can be performed by the aforementioned power supply device. The method can include: converting a received alternating-current voltage into a first pulsating direct-current voltage; converting the first pulsating direct-current voltage into a second pulsating direct-current voltage; controlling the energy storage unit to obtain electric energy when the voltage of two terminals of the energy storage unit is lower than the first voltage value; controlling the energy storage unit to provide electrical energy to the circuit port outputting the first pulsating direct-current voltage when the voltage value of the first pulsating direct-current voltage is lower than the second voltage value, to increase the valley voltage of the first pulsating direct-current voltage; and converting the second pulsating direct-current voltage into a constant direct-current voltage and outputting the constant direct-current voltage.

According to yet another aspect, a power supply system is provided. The power supply system can include an electronic device and a power supply device, such as the power supply device described according to embodiments of the present disclosure. The power supply device can be configured to supply electrical power to the electronic device. In a possible scenario, the electronic device can operate directly with the electrical power supplied by the power supply device. In another possible scenario, the electronic device charges a battery with the electrical power supplied by the power supply device. Alternatively, the electronic device may divert a portion of the electrical power supplied by the power supply device to charge its battery while using the remaining power for normal operation.

According to still another aspect, a computer-readable storage medium is provided. The computer-readable storage medium stores at least one instruction that is loaded and executed by a processor to implement the circuit control method provided by the various embodiments of the present disclosure. It should be noted that, the above-mentioned circuit control method of the disclosure may also be implemented through a hardware circuit and is not limited to the embodiments disclosed herein.

According to still yet another aspect, a computer program product is provided. The computer program product includes computer instructions stored in the computer-readable storage medium. A processor of the computer device reads the computer instructions from the computer-readable storage medium, and the processor executes the computer instructions to cause the computer device to perform the above circuit control method provided by the various alternative implementations. It should be noted that, the above-mentioned circuit control method may also be implemented through a hardware circuit and is not limited to the embodiments disclosed herein.

BRIEF DESCRIPTION OF DRAWINGS

To better illustrate the technical solutions in the embodiments of this disclosure, the drawings used in the description will be briefly explained. It should be noted that the drawings in this description are only some examples of the disclosure. Those skilled in the art can create other drawings based on these without any creative effort.

DETAILED DESCRIPTION

Figure 1:
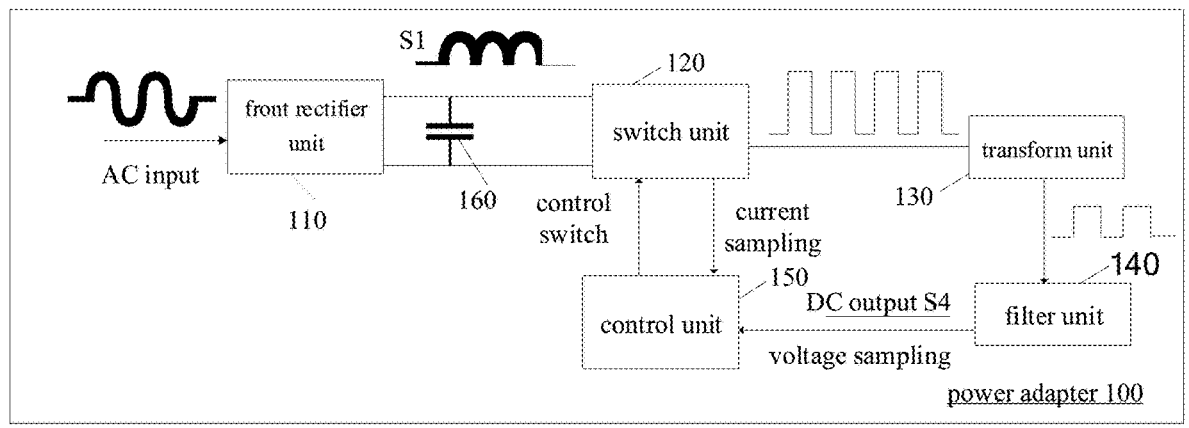
FIG. 1 is a schematic structural diagram of a power supply device in the related art.

To make objectives, technical solutions, and advantages of the disclosure clear, examples of the disclosure will be further described in detail with reference to the drawings.

In the following description, the same numerals in different drawings refer to the same or similar elements unless otherwise specified. The implementations described in these exemplary embodiments are not representative of all possible implementations consistent with the disclosure. Rather, they are only examples of devices and methods that align with some aspects of the disclosure as detailed in the appended claims.

In the description of the disclosure, terms, such as "first", "second", etc., are merely used for descriptive purposes and are not intended to be construed as indicating or implying relative importance. In the description of the disclosure, it should be noted that, unless otherwise expressly specified and limited, terms "connected" and "connection" should be understood broadly, for example, as fixed connection, as removable connection, or as integrally connection; as mechanical connection, as electrical connection, or as communication connection; as direct connection, as indirect connection through an intermediate medium. For those skilled in the art, specific meanings of the above terms in the disclosure may be understood according to specific conditions. In description of the disclosure, "a plurality of or multiple" means two or more than two. A term "and/or" is used to describe an association of related objects, and indicates that three relationships may exist, for example, "A and/or B" may indicate the presence of A alone, B alone, and both A and B. The character "/" generally indicates that the related objects before and after the character are in an "or" relationship.

The embodiments of the disclosure provide technical solutions as follows.

A power supply device, can include an input rectifier circuit, a first-stage conversion circuit, a valley-fill circuit and a second-stage conversion circuit.

The input rectifier circuit can be configured to convert a received alternating-current voltage into a first pulsating direct-current voltage.

The first-stage conversion circuit can be connected to the input rectifier circuit, wherein the first-stage conversion circuit can be configured to convert the first pulsating direct-current voltage into a second pulsating direct-current voltage.

The valley-fill circuit has an energy storage unit and a first switch unit. The first switch unit can be connected to the first-stage conversion circuit and the energy storage unit, and the first switch unit can be configured to switch on when the voltage of the energy storage unit is lower than a first voltage value, to thereby enable the energy storage unit to obtain electrical power from the first-stage conversion circuit.

The energy storage unit can be connected to the first-stage conversion circuit, and the energy storage unit can be configured to supply electrical power when the voltage value of the first pulsating direct-current voltage is lower than a second voltage value, to increase a valley voltage of the first pulsating direct-current voltage.

The second-stage conversion circuit can be connected to the first-stage conversion circuit, where the second-stage conversion circuit is configured to convert the second pulsating direct-current voltage into a constant direct-current voltage and output the constant direct-current voltage.

In at least one alternative embodiment, the first switch unit is configured to switch off when the voltage of the energy storage unit is higher than or equal to the first voltage value.

In at least one alternative embodiment, the first-stage conversion circuit includes a second switch unit, a voltage transformation unit and a first rectifier unit. The voltage transformation unit can be configured to convert a modulated voltage into an alternating-current input voltage. The modulated voltage can be a voltage obtained through chopper processing by the second switch unit on the first pulsating direct-current voltage. The first rectifier unit can be configured to convert the alternating-current input voltage into the second pulsating direct-current voltage.

In at least one alternative embodiment, the energy storage unit is connected to two terminals of a secondary winding of the voltage transformation unit. The energy storage unit can be configured to obtain electrical power supplied by the voltage transformation unit. The first switch unit can be configured to control a loop between the energy storage unit and the secondary winding to switch on or off. The first switch unit can control the loop to switch on, and the energy storage unit may obtain electrical power from the voltage transformation unit when the voltage of two terminals of the energy storage unit is lower than the first voltage value.

In at least one alternative embodiment, the valley-fill circuit further includes a buck circuit. The buck circuit can be configured to operate when the first pulsating direct-current voltage is lower than the second voltage value. The energy storage unit releases the stored electrical power through the buck circuit, so as to increase the valley voltage of the first pulsating direct-current voltage when the buck circuit operates.

In at least one alternative embodiment, the buck circuit includes a diode, a third switch unit and a filter inductor. The diode can be connected between the filter inductor and a first terminal of the energy storage unit. The third switch unit can be connected between the filter inductor and a second terminal of the energy storage unit. The filter inductor can be connected between the third switch and a first capacitor, where the first capacitor is connected in parallel with the output terminal of the input rectifier circuit.

In at least one alternative embodiment, the valley-fill circuit further includes a second rectifier unit. The second rectifier unit is respectively connected to the voltage transformation unit and the first switch unit. The first switch unit can be connected to the voltage transformation unit through the second rectifier unit. The second rectifier unit can be configured to rectify alternating-current voltage from the voltage transformation unit into a direct-current voltage, where the direct-current voltage is configured to supply electrical power for the energy storage unit.

In at least one alternative embodiment, the power supply device further comprises a second filter capacitor. The second filter capacitor can be connected to the output terminal of the first-stage conversion circuit.

In at least one alternative embodiment, the input rectifier circuit can be connected to an external alternating-current input. The external alternating-current input can be configured to input the alternating-current voltage to the power supply device.

In at least one alternative embodiment, a connection of the input rectifier circuit with the external alternating-current input is a three-phase port or a two-phase port.

In at least one alternative embodiment, the second-stage conversion circuit is connected to a first port of a matched cable, and the cable is configured to supply the constant direct-current power to outside through a second port thereof.

In at least one alternative embodiment, the first port includes a universal serial bus (USB) port.

In at least one alternative embodiment, the cable is provided with a power management chip, and the power management chip is configured to manage power of a current flowing through the cable.

In at least one alternative embodiment, the second port includes one selected from the group consisting of: a Type-C interface, a micro-USB interface and a lightning interface.

In at least one alternative embodiment, the power supply device includes three layers of printed circuit boards (PCBs), including a first PCB, a second PCB, and a third PCB, respectively. The first PCB can be configured to connect with the voltage transformation unit. The second PCB can be provided with an output terminal of the second-stage conversion circuit, and the second PCB may be arranged at a spatial position between the first PCB and the third PCB. The third PCB can be a main board of the power supply device.

In at least one alternative embodiment, the filter capacitor is either on the first PCB or the filter capacitor is on the third PCB, and the second PCB is hollow at the space occupied by the filter capacitor, where a size of the filter capacitor is larger than a threshold.

The power supply device provided by the present disclosure can use a valley-fill circuit instead of large-volume capacitors, such as electrolytic capacitors. This can enable the second-stage conversion circuit to maintain a sufficiently high valley voltage, ensuring the stability of the overall output voltage. By controlling the voltage and ensuring that it does not exceed the rated value of the energy storage unit in the valley-fill circuit, the power supply device can maximize its ability to store electrical energy while reducing the voltage resistance requirements of the energy storage unit. This can allow for a miniaturized design and improved portability of the power supply device.

To provide a thorough understanding of the disclosure, the following terms used in the embodiments are described below.

An alternating-current voltage can be a commercial power input into the power supply device in the embodiments of the disclosure. An instantaneous value of the alternating-current voltage may be a value of the alternating-current voltage. In other embodiments of the disclosure, the voltage outputted by the voltage transformation unit can be an alternating-current voltage.

A pulsating direct-current voltage can be an electrical signal output by the first-stage conversion circuit after processing by the first rectifier unit in the embodiments of the disclosure. A value of the electrical signal can be a voltage value of the pulsating direct-current voltage. Without intervention of the valley-fill circuit, a valley voltage value of the pulsating direct-current voltage can approach or be equal to 0.

Prior art power supply devices include a bulky energy storage unit to store electrical power, which results the overall volume for power supply device being large.

FIG. 1 is a schematic structural diagram of a power supply device in the related art. The power supply device 100 includes a front rectifier unit 110, a switch unit 120, a transform unit 130, a filter unit 140, a control unit 150 and an energy storage unit 160.

The power supply device 100 described herein can have the function of converting commercial alternating current (AC) voltage into a specified form of direct current (DC) voltage. Based on this, the following will introduce the function of each unit in the operation of the power supply device 100.

The front rectifier unit 110 is configured (i.e., structured and arranged) to rectify an AC voltage received by the power supply device 100. A voltage S1 that has been rectified by the front rectifier unit 110 is a pulsating DC voltage, as detailed according to FIG. 1.

After the power supply device 100 obtains the voltage S1, the switch unit 120, the transform unit 130 and the filter unit 140 will convert the voltage S1. As such, the pulsating DC voltage S1 is converted into a stable DC-S4. Specifically, a part of the voltage S1 will be charged to the energy storage unit 160, which is usually an electrolytic capacitor. The voltage S1 is filtered by the electrolytic capacitor to obtain a DC voltage with less fluctuation. The electrolytic capacitor uses the energy stored therein to maintain a stable output voltage, when a low AC input voltage is input to the electrolytic capacitor.

The control unit 150 samples a voltage output by the power supply device 100 and samples a current of the switch unit 120 respectively, thereby acquiring a voltage sampling signal and a current sampling signal. In addition, the control unit 150 controls, based on the voltage sampling signal and the current sampling signal, a switch mode and durations for opening and closing the switch unit 120 of the switch unit 120, thereby controlling the output voltage and/or the output current of the power supply device 100.

In at least one alternative embodiment, the power supply device may be a power adapter.

In the field of power conversion technology, the use of bulky electrolytic capacitors results in power supply devices having a large volume, making them less portable for users. When carrying the power supply device, it takes up a significant amount of space, preventing the user from carrying other objects. If the user decides not to carry the power supply device due to its large size, their electronic device may not be charged in time and may not be able to be used continuously.

According to the present disclosure, the following technical solutions can reduce the volume of a power supply device. For instance, FIG. 2 is a schematic structural diagram of a power supply device including a two-stage architecture according to an embodiment of the disclosure.

Figure 2:
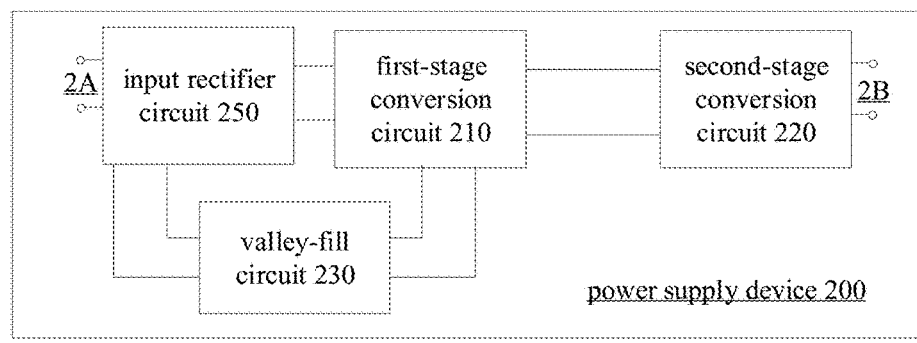
FIG. 2 is a schematic structural diagram of a power supply device including a two-stage architecture according to an embodiment of the disclosure.

As illustrated in FIG. 2, the power supply device 200 includes a first-stage conversion circuit 210, a second-stage conversion circuit 220, a valley-fill circuit 230, an input terminal 2A, an output terminal 2B and an input rectifier circuit 250.

In the embodiments of the disclosure, the input rectifier circuit 250 is configured to convert received AC power into a first pulsating DC voltage. Specifically, the input rectifier circuit 250 may be a rectifier bridge BD1 configured to connect with commercial power. In this technical field, the commercial power is usually in a form of AC voltage, and a voltage and a frequency of the AC voltage are different in different regions. For example, in a current technical development scenario, the voltage of the commercial power ranges from 100V to 240V, and the frequency of the commercial power ranges from 50 Hz to 60 Hz. For example, the first-stage conversion circuit 210 may be a DCX circuit.

The first-stage conversion circuit 210 receives the first pulsating DC voltage output by the rectifier bridge BD1, and converts the first pulsating DC voltage into a second pulsating DC voltage. It should be noted that, the minimum value of the second pulsating DC voltage output by the first-stage conversion circuit 210 alone is close to 0 or equal to 0. Specifically, the first-stage conversion circuit 210 is configured to perform an efficient isolation conversion on the first pulsating DC voltage. The isolation conversion may be a boost conversion, a buck conversion or other conversions, which may be set according to specific design parameters.

It should be noted that, in embodiments of the disclosure, there can be no electrolytic capacitor disposed in the first-stage conversion circuit 210, and the stable output voltage can be produced without using an electrolytic capacitor. The first-stage conversion circuit 210 can be provided with a unit for boosting the input AC voltage, allowing it to provide a consistent bus voltage at the output terminal regardless of whether the input AC voltage is in a low or high range. This provides voltage support for the output voltage. Additionally, with the valley-fill circuit, it is not necessary to use a large-volume electrolytic capacitor in the power supply device. Instead, a film capacitor, ceramic capacitor, tantalum capacitor, or small-volume electrolytic capacitor, thereby reducing the volume of the power supply device. It should be noted that other types of capacitors may also be used and are not limited to the embodiments disclosed.

The structure described above removes the electrolytic capacitor from the solutions provided by embodiments of the present disclosure. Without it, the minimum value of the second pulsating DC voltage output by the original first-stage conversion circuit 210 can be close to 0, and the amplitude of the voltage jitter may be too large for the subsequent circuit to output the constant DC power. It should be noted that an input voltage value of the second-stage conversion circuit 220 can be equal to an output voltage value of the first-stage conversion circuit 210.

Based on this, the present disclosure can achieve the effect of ensuring that the minimum value of the input voltage of the first conversion circuit is greater than the second voltage value by adding a valley-fill circuit at the input terminal of the first-stage conversion circuit. This causes the valley portion of the pulsating DC voltage output by the second-stage conversion circuit 220 to maintain a specified value under the action of the valley-fill circuit. In other words, the valley-fill circuit in the power supply device provided by the present disclosure can fill the valley voltage of the pulsating DC voltage.

Moreover, the second-stage conversion circuit 220 connected to the first-stage conversion circuit 210 can be configured to convert the pulsating DC voltage output by the first-stage conversion circuit 210 to obtain the constant DC voltage, and output the constant DC power to meet power demands of various electronic devices.

In use, the power supply device may further include a drive circuit, a voltage detection circuit, a current detection circuit, and/or a microprogrammed control unit (MCU) control circuit. The functions of such circuits in power supply devices are well known in the field, and will therefore not be described in detail.

For example, when the power supply device is not provided with an electrolytic capacitor to reduce its volume, the power supply device may require a corresponding electronic device to be able to receive the pulsating DC power. In this scenario, the power supply device with reduced volume may only charge the electronic device capable of receiving the pulsating DC voltage. When traveling, studying, or on a business trip, a user often carries various electronic devices, such as a smartphone, tablet, and laptop. Each of these electronic devices require a corresponding power supply device to charge. As a result, the user may need to carry multiple power supply devices, taking up a significant amount of space. A power supply device having a reduced volume may only be able to charge specific electronic devices, such as a smartphone designed to receive and use pulsating DC power. However, some electronic devices may not be capable of receiving such pulsating DC power. To address this issue, embodiments of the present disclosure describe a power supply device capable of outputting constant DC voltage while reducing its overall volume. When the reduced-volume power supply device outputs constant DC voltage, the user can charge multiple electronic devices using just one small-volume power supply device.

It should be noted that, based on the power supply device 200 illustrated in FIG. 2, the voltage transformation unit may be disposed in a transformer. Two sides of the transformer can be provided with respective isolation plates that are configured to divide physical spaces for the transformer and other components.

In at least one alternative embodiment, the input rectifier circuit is connected to the external alternating-current input, and obtains AC power from the port of the external alternating-current input. In other possible embodiments, a connection of the input rectifier circuit with the external alternating-current input is a three-phase port or a two-phase port. In at least one alternative embodiment, the second-stage conversion circuit is connected to a first port of a matched cable at the output terminal of the power supply device 200, and the cable is configured to supply constant DC power to outside through a second port of the cable. For example, the matched cable may be a data cable.

In at least one alternative embodiment, the first port includes a universal serial bus (USB) port. The cable includes a power management chip, and the power management chip can be configured to manage power of a current flowing through the cable. As an example, the second port can be one of the following: a Type-C interface, a micro-USB interface, and a lightning interface.

In at least one alternative embodiment, the power supply device 200 includes three layers of printed circuit boards (PCBs), including a first PCB, second PCB, and third PCB, respectively. The first PCB can be connected to the voltage transformation unit. The second PCB can be provided with the output terminal of the second-stage conversion circuit, and spatially arranged between the first PCB and the third PCB. The third PCB can be a main board of the power supply device.

In at least one alternative embodiment, the filter capacitor is on the first PCB, or the filter capacitor is on the third PCB, and the second PCB is hollow at a space occupied by the filter capacitor when a size of the filter capacitor is larger than a threshold. Specifically, the threshold may be a volume threshold, a height threshold, or other size threshold(s). The present disclosure is not limited to the type of threshold used.

According to embodiments of the present disclosure, at least one filter capacitor may be further added to the first-stage conversion circuit of the power supply device. It should be noted that the capacitance of the filter capacitor may be adjusted according to design requirements. In a possible implementation, when there are at least two filter capacitors, the at least two filter capacitors may be connected in parallel and arranged at the output of the first-stage conversion circuit.

Figure 3:
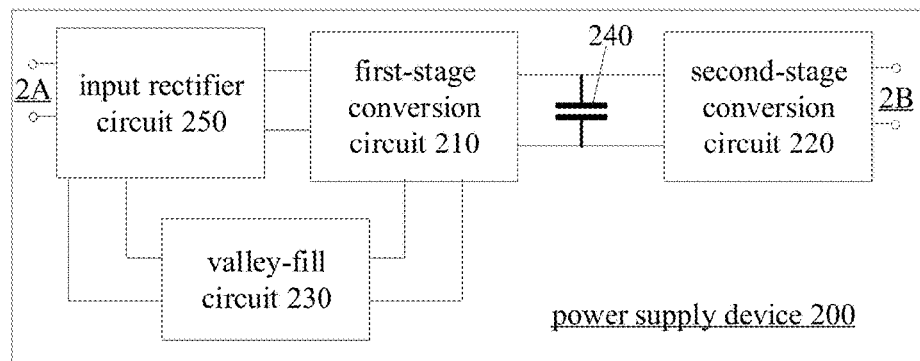
FIG. 3 is a schematic structural diagram of a power supply device according to another embodiment of the disclosure.

FIG. 3 is a schematic structural diagram of a power supply device according to another embodiment of the disclosure. The power supply device includes a first-stage conversion circuit 210, a second-stage conversion circuit 220, a second filter capacitor 240, and an input rectifier circuit 250.

Specifically, the functions of the first-stage conversion circuit 210 and the second-stage conversion circuit 220 are the same as those illustrated in FIG. 2, and will therefore not be repeated here.

The second filter capacitor 240 is connected to the output terminal of the first-stage conversion circuit 210. In other words, the second filter capacitor 240 is connected to the input terminal of the second-stage conversion circuit 220. In one possible implementation, the volume of the second filter capacitor is positively correlated with its capacitance value. For example, if the volume of the second filter capacitor in the disclosure must be smaller than a specified size, its capacitance will be limited.

It should be noted that, the preset capacitance is a capacitance value of a capacitor with a same filtering capability. When the capacitance value of the filter capacitor is small, the volume of the filter capacitor can be accordingly reduced.

Figure 4:
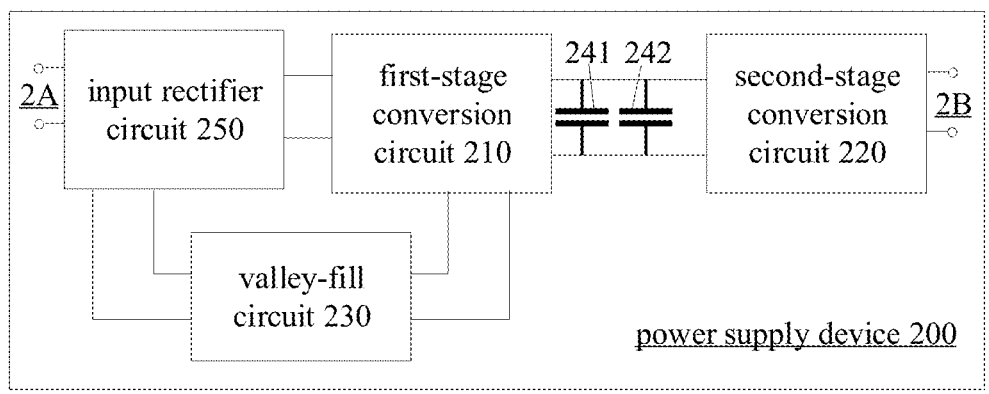
FIG. 4 is a schematic structural diagram of a power supply device based on the embodiment illustrated in FIG. 3.

Similarly, FIG. 4 is a schematic structural diagram of a power supply device based on the embodiment illustrated in FIG. 3. As illustrated in FIG. 4, the power supply device includes a first-stage conversion circuit 210, second-stage conversion circuit 220, and two second filter capacitors 241, 242. It should be noted that, the second filter capacitor 241 and the second filter capacitor 242 are arranged in parallel, and may be replaced by providing a single capacitor as illustrated in FIG. 3. Based on the available space for placing the capacitor and the circuit layout, a designer may choose one of the capacitor arrangement options illustrated in FIG. 3 or FIG. 4 to meet their specific requirements.

Furthermore, FIG. 3 illustrates a filter capacitor arrangement in which only one filter capacitor is provided in the power supply device. FIG. 4 illustrates another filter capacitor arrangement in which multiple filter capacitors are provided in the power supply device. If more than one filter capacitor is needed, they can be connected in parallel between the first-stage conversion circuit 210 and the second-stage conversion circuit 220.

For example, when the designer needs to set N second filter capacitors, the designer may arrange, based on the design illustrated in FIG. 4, N−1 filter capacitors connected in parallel between two terminals of the first filter capacitor 241, so that there are N filter capacitors connected in parallel between two ends of the input terminal of the second-stage conversion circuit 220. Wherein N can be an integer greater than or equal to 2.

For example, the filter capacitor may be one of the following: a film capacitor, a multi-layer ceramic capacitor (MLCC), a chip capacitor, and an electrolytic capacitor. In one specific embodiment, the filter capacitor is an MLCC.

Figure 5:
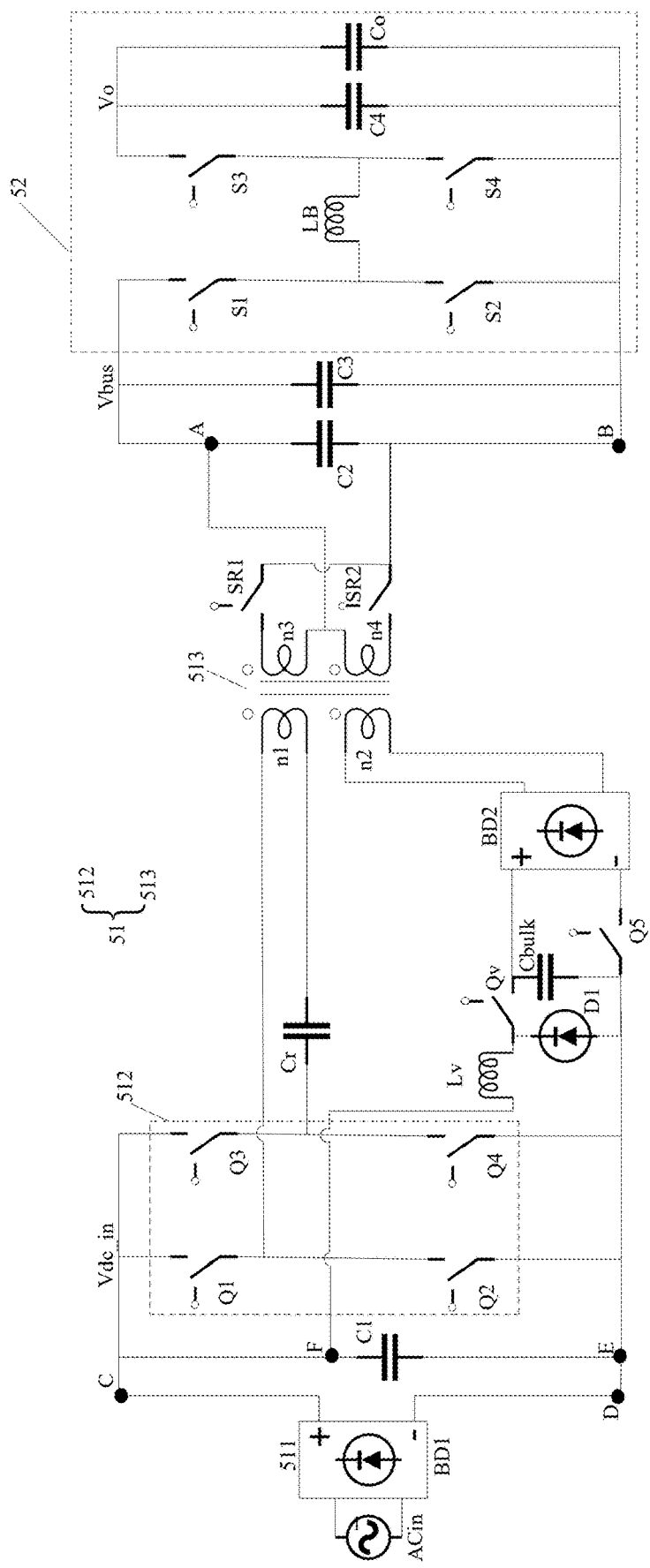
FIG. 5 is a schematic principle diagram of a power supply device according to still embodiment of the disclosure.

FIG. 5 is a schematic diagram of a power supply device according to another embodiment of the present disclosure. As illustrated in FIG. 5, the power supply device includes a input rectifier unit 511, first-stage conversion circuit 51, second-stage conversion circuit 52, and valley-fill circuit. It should be noted that the components included in the second-stage conversion circuit 52 are illustrated by dashed-line boxes, and the valley-fill circuit is an electrical path connected between an electrical connection point A and an electrical connection point F and further connected to a secondary winding n2.

First, the input rectifier unit 511 is configured to receive AC power, and the AC power may be an input of the power supply device. In other words, the AC power may be commercial power which obtains by the power supply device from a socket through a plug. After the input rectifier unit 511 obtained the commercial power, the input rectifier unit 511 511 may convert the AC voltage into a first pulsating DC voltage. It should be noted that the first pulsating DC voltage may be a voltage between an electrical connection point C and an electrical connection point D illustrated in FIG. 5.

Second, the first-stage conversion circuit 51 includes a second switch unit 512, and a voltage transformation unit 513.

The second switch unit 512 is configured to connect with the input rectifier unit 511 and the voltage transformation unit 513. As illustrated in FIG. 5, the second switch unit 512 includes a first switch Q1, a second switch Q2, a third switch Q3, and a fourth switch Q4 that are bridge-connected. The second switch unit 512 further includes a first capacitor C1. For example, the first capacitor C1 functions to both filter and store energy. It should be noted that there may only be one first capacitor C1. Alternatively, on the basis of providing the first capacitor C1, multiple storage capacitors may be connected in parallel with the first capacitor C1. The first capacitor C1 is connected in parallel with the output terminal of the input rectifier circuit (that is the input rectifier unit 511 511).

The voltage transformation unit 513 is configured to convert a modulated voltage into an alternating-current input voltage, wherein the modulated voltage is a voltage obtained through processing by the second switch unit 512.

Specifically, the voltage transformation unit 513 includes a primary winding n1, a secondary winding n2, a secondary winding n3, a secondary winding n4, and a magnetic core.

The secondary winding n3 and secondary winding n4 of the voltage transformation unit 513 are connected to the first rectifier unit. The first rectifier unit is configured to convert the alternating-current voltage into the second pulsating direct-current voltage. For example, the secondary winding n3 is connected to a switch tube SR1 of the first rectifier unit. The secondary winding n4 is connected to a switch tube SR2 of the first rectifier unit. The first rectifier unit includes the switch tube SR1 and the switch tube SR2. The first rectifier unit is configured to convert the alternating-current input voltage outputted by the voltage transformation unit into second pulsating direct-current voltage.

A capacitor Cr can be provided on a path between the primary winding n1 and the third switch Q3, or on a path between the primary winding n1 and the fourth switch Q4. The capacitor Cr can be a resonance capacitor. A resonance point can serve two functions. Firstly, it can isolate a DC voltage to prevent the voltage transformation unit 513 from entering a saturated state. Secondly, it can enable soft switching of the switches Q1 to Q4 through resonance, reducing losses.

In the illustrated embodiment, the first-stage conversion circuit can be a DC-DC transformer (DCX) circuit. This circuit can compress the fluctuation range of the first pulsating DC voltage input by the input rectifier unit 511 through alternating full-bridge and half-bridge operation of switches Q1 to Q4. The voltage transformation unit 513 converts the modulated voltage into an AC output voltage. The modulated voltage is obtained through chopper processing by the second switch unit on the first pulsating direct-current voltage.

The secondary winding n3 and the secondary winding n4 are configured to transform the electrical power that is input into the voltage transformation unit 513 by the primary winding n1 to the second-stage conversion circuit 52.

In at least one alternative embodiment, in a buck scenario, the second pulsating direct-current voltage is lower than the first pulsating direct-current voltage in a "buck scenario". Two terminals of the secondary winding n2 can be connected to the valley-fill circuit.

For example, the first-stage conversion circuit can perform the function of the DC voltage transformation unit by converting high-voltage pulsating DC power into low-voltage pulsating output. In an alternative embodiment, when the voltage fluctuation range is between 90V and 264V, the low-voltage range is from 90Vac to 130Vac and the high-voltage range is from 180Vac to 264Vac.

In this embodiment, the energy storage unit is a capacitor Cbulk and the second rectifier unit is a rectifier bridge BD2. The first terminal of the capacitor Cbulk is connected to switch Q5, and the second terminal is connected to the positive pole of the rectifier bridge BD2.

In FIG. 5, the second rectifier unit (namely, the rectifier bridge BD2) is respectively connected to the secondary winding n3 in the voltage transformer and the first switch unit (namely, the switch tube Q5). The second rectifier unit rectifies the AC voltage output from the secondary winding n3 of the voltage transformer into a DC voltage, so that the DC voltage can provide electrical energy for the energy storage unit. The presence of the second rectifier unit allows the AC voltage output by the transformer unit to be rectified into a DC voltage, providing a smooth flow of electrical energy to the energy storage unit.

In at least one alternative embodiment, the second rectifier unit can be a diode or other electronic component having a rectifying function.

According to embodiments of the present disclosure, the secondary winding n2 in the voltage transformation unit of the first-stage conversion circuit charges and stores energy for the capacitor Cbulk after rectification by the rectifier bridge BD2. This can ensure that the final output of the power supply device is a constant direct current. For example, a third switch unit Qv, a freewheeling diode D1, and a filter inductor Lv can constitute a buck circuit. When the rectified voltage Vdc_in is lower than the second voltage value, which can be a set value, the buck circuit starts to operate. Cbulk releases energy through the buck circuit and increases the valley voltage value of Vdc_in, raising the output voltage of the first-stage conversion circuit. This reduces the peak current of the second-stage conversion circuit, and decreases the required volume of the magnetic element. The switch tube Q5 is turned off when the rectified voltage of BD2 is higher than DC 400V, and is switched on when it is lower than DC 400V, providing voltage clipping. With this design, the voltage transformation unit can have a higher turns ratio n2:n1. The voltage at both terminals of Cbulk is controlled by cutting the top during the entire AC input high voltage period of the power supply device to ensure that it does not exceed Cbulk's rated voltage value.

In at least one alternative embodiment, the secondary winding n2, the rectifier bridge BD2, the capacitor Cbulk and the switch tube Q5 constitute the loop shown in the embodiment of the disclosure.

That is, the valley-fill circuit provided by the disclosure includes a capacitor Cbulk serving as a charging unit and a switch tube Q5 serving as a first switch unit. The switch tube Q5 is respectively connected to the first-stage conversion circuit and the capacitor Cbulk. The switch tube Q5 is switched on when the voltage of the capacitor Cbulk is lower than the first voltage value (ie, DC400V in the above example), thus the capacitor Cbulk obtains electrical energy from the first-stage conversion circuit. On the other hand, the capacitor Cbulk is connected to the first-stage conversion circuit, and is configured to provide electric energy to increase the valley voltage of the first pulsating DC voltage when the voltage value of the first pulsating DC voltage is lower than the second voltage value.

Figure 6:
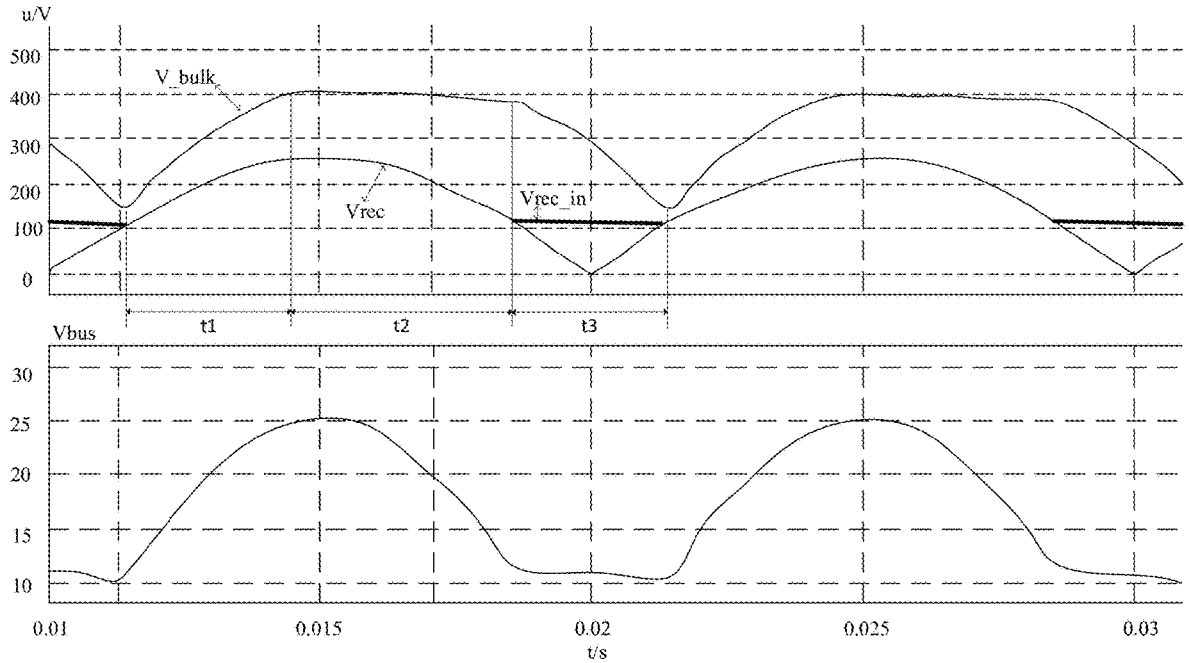
FIG. 6 is a simulation waveform diagram of a key voltage according to an embodiment of the disclosure.

FIG. 6 shows a simulation waveform of a key voltage provided by an embodiment of the disclosure. With an input of 180Vac and the first-stage conversion circuit in half-bridge working mode, the first switch Q1 and second switch Q2 do not work and the output power of the power supply device is 70 W. The input valley voltage of the first-stage conversion circuit is very low and close to 0V, making it impossible to regulate the output voltage Vo. However, by using the valley filling circuit provided in the disclosure and adjusting the turns ratio of n1:n2 in the MLCC and voltage transformation unit, the valley voltage inputted by the first-stage conversion circuit can be effectively increased.

In FIG. 6, V_bulk is a Cbulk voltage, Vrec is an AC rectified voltage without the valley-fill circuit, and Vrec_in is the AC rectified voltage after adding the valley-fill circuit. During the t1 time period, V_bulk is lower than 400V, and Q5 remains switched on. At this time, the voltage of the winding n2 charges and stores energy for the capacitor Cbulk after rectified by BD2, and the buck does not operate. During the t2 time period, when V_bulk is over 400V, Q5 is switched off, the Cbulk capacitor maintains the current voltage, and the power of the adapter will continue to be borne by the AC input. The AC rectified voltage gradually decreases after the peak, and Q5 is switched off again when V_bulk is lower than 400V. During the t3 time period, when the AC rectified voltage drops to the set value V1, the buck circuit starts to operate, and the energy of Cbulk charges C1 through the buck circuit, which increases effectively the input valley voltage of DCX and maintains power transmission. If there is no valley-fill circuit in the disclosure, the valley voltage will drop to 0.

In FIG. 6, the time point when Q5 is switched off is the right endpoint of t1, or its end time. The start-up time of the buck circuit is the left endpoint of t3, or the start time of t3.

According to embodiments of the present disclosure, the startup and shutdown of the valley filling circuit can be automatically realized by reasonably designing the value of V1 and adding a buck circuit. The disclosure can control the voltage at both terminals of the energy storage capacitor Cbulk through Q5 and try to use its energy storage capacity as much as possible without exceeding its rated voltage. This reduces the requirements for the capacitor's withstand voltage, allowing for a smaller size and miniaturized design. It should be noted that the first switch unit in the disclosure may be implemented as Q5 and the energy storage capacitor as Cbulk. Q5 switches on or off according to the voltage of Cbulk's two terminals. When the voltage across Cbulk is lower than the first voltage value, the first switch unit controls Cbulk to switch off to the second-stage conversion circuit, to obtain electrical energy. When across Cbulk is equal to or higher than the first voltage value, the first switch unit controls Cbulk and the second-stage conversion circuit to switch off, preventing Cbulk from burning out due to excessive voltage. The first switch unit in the valley-fill circuit cuts the top of Cbulk's input voltage waveform, ensuring its voltage does not exceed the first voltage value.

Third, the second-stage conversion circuit 52 includes a fifth switch S1, sixth switch S2, seventh switch S3, eighth switch S4, second inductor LB, second filter capacitor C2, second filter capacitor C3, third capacitor C4, and fourth capacitor Co.

Specifically, the second filter capacitor C2 and the second filter capacitor C3 are both configured to perform filtering processing.

In a possible scenario, the second-stage conversion circuit 52 is a DC/DC circuit and configured to convert the low-voltage pulsating DC power output by the first-stage conversion circuit into a stable DC output for supplying the electronic device. In the example illustrated in FIG. 5, the second-stage conversion circuit 52 uses a buck-boost circuit to transform the input voltage that is higher than, lower than or equal to an output voltage value to a stable output voltage. It should be noted that the structures of the first-stage conversion circuit and the second-stage conversion circuit illustrated in FIG. 5 are only schematic illustrations. The first-stage conversion circuit may also be implemented as other forms of DCX, and the second-stage conversion circuit may also be other DC/DC circuit topologies.

For example, when the circuit illustrated in FIG. 5 operates, the first-stage conversion circuit switches between full-bridge and the half-bridge modes. It adopts the full-bridge mode when the current input belongs to the low-voltage range and the half-bridge mode when it belongs to the high-voltage range. With this design, a power supply device with a wide input voltage variation range can enable the second-stage conversion circuit to with a small input voltage variation range, facilitating the optimization.

For example, when the input AC voltage is in the low-voltage range, the first-stage conversion circuit adopts the full-bridge mode and enables the four switch units (i.e., switch tubes) in the circuit to work, and a fixed voltage gain is denoted as Z1, for example. In this scenario, when the input AC voltage is in the high-voltage range, the first-stage conversion circuit adopts the half-bridge mode, and the fixed voltage gain is denoted as Z2 for example. Z1 is required to be greater than Z2. Since the low-voltage AC power gets the high gain (i.e., the gain of Z1) supported by the full-bridge mode, the voltage range which is ultimately output by the first-stage conversion circuit may be controlled to be within a relatively narrow range.

In summary, the power supply device provided by the present disclosure can use a valley-fill circuit instead of an electrolytic capacitor or other large-volume capacitor. This can enable the second-stage conversion circuit to have a sufficiently high valley voltage, ensuring the stability of the overall output voltage. The power supply device can maximize its ability to store electrical energy by controlling that the voltage and ensuring that it does not exceed the rated value of the energy storage unit in the valley-fill circuit. This can reduce the requirement for voltage resistance and allow for a miniaturized design, improving the portability of the power supply device.

Figure 7:
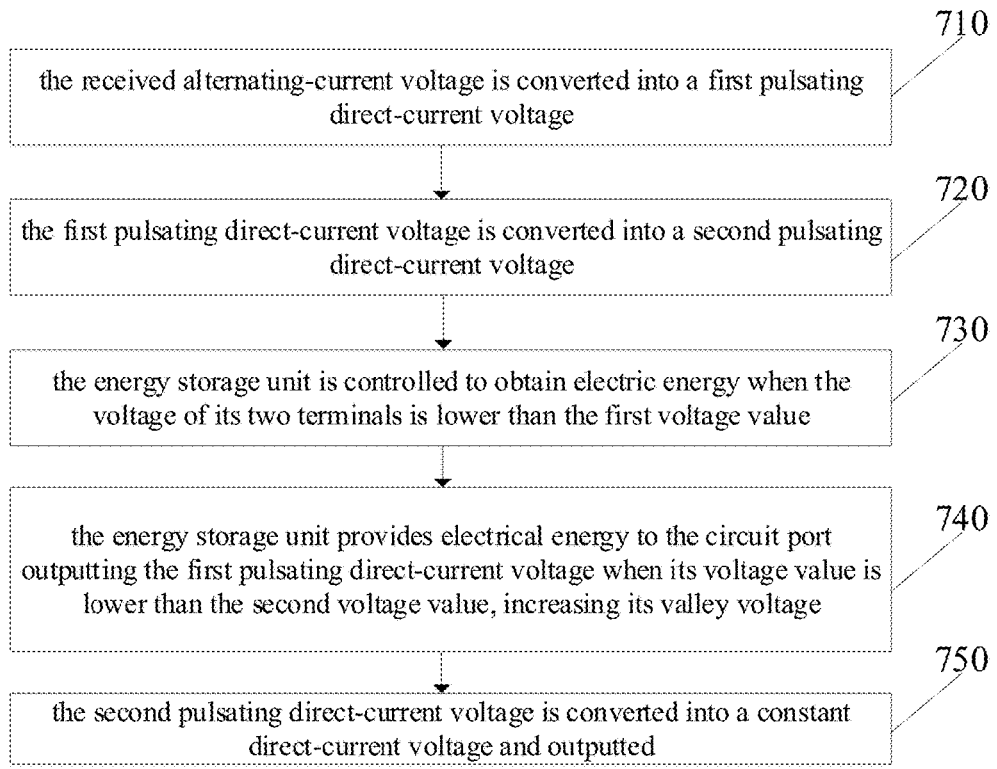
FIG. 7 is a schematic flowchart of a circuit control method according to an exemplary embodiment of the disclosure.

FIG. 7 is a schematic flowchart of a circuit control method according to an exemplary embodiment of the present disclosure. The circuit control method may be applied to control the aforementioned power supply devices. As illustrated in FIG. 7, the circuit control method includes the following operations.

At operation 710, the received alternating-current voltage is converted into a first pulsating direct-current voltage.

At operation 720, the first pulsating direct-current voltage is converted into a second pulsating direct-current voltage.

At operation 730, the energy storage unit is controlled to obtain electric energy when the voltage of its two terminals is lower than the first voltage value.

At operation 740, the energy storage unit provides electrical energy to the circuit port outputting the first pulsating direct-current voltage when its voltage value is lower than the second voltage value, increasing its valley voltage.

At operation 750, the second pulsating direct-current voltage is converted into a constant direct-current voltage and outputted.

It should be noted that the control method provided by the embodiment of the disclosure can be performed by a control chip, a circuit of a power supply device as described in the present disclosure, or means as understood to those having ordinary skill in the art.

In summary, the circuit control method provided by this embodiment can be applied to the power supply devices provided by other embodiment(s) of the present disclosure. The circuit control method can convert the input AC voltage into a pulsating DC voltage through two-stage adjustment, and then convert the pulsating DC voltage into a constant DC voltage. The energy storage unit can increase the valley voltage of the first pulsating DC voltage, reducing its fluctuation and realizing a constant DC voltage for the final output. The voltage value of the energy storage unit used for energy supply is always maintained below the first voltage value to prevent it from burning out. This makes it convenient for electronic devices to directly use the electric energy. The power supply device can automatically output a constant direct current after its volume is reduced, providing a constant direct current to electronic devices.

Figure 8:
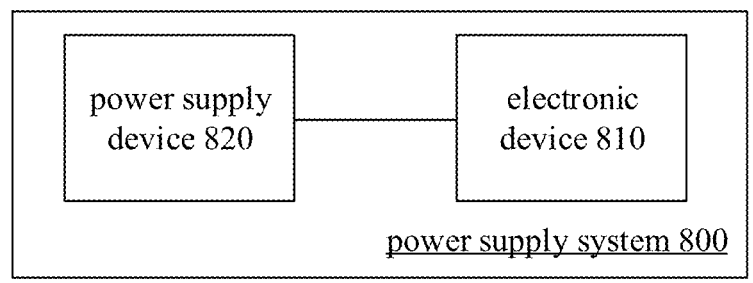
FIG. 8 is a schematic block diagram of a power supply system according to an exemplary embodiment of the disclosure.

FIG. 8 is a schematic block diagram of a power supply system according to an exemplary embodiment of the disclosure. The power supply system may include the power supply device and the electronic device described generally herein. As illustrated in FIG. 8, the power supply device 800 includes the electronic device 810 and the power supply device 820.

Specifically, the power supply device 820 may supply electrical power to the electronic device 810 through a wired cable or a wirelessly, for example via an induction winding.

The power supply system can be used to charge a variety of devices such as smartphones, tablet computers, notebook computers, smartwatches, cleaning robots, smart glasses, Bluetooth speakers, Bluetooth headsets, or smart bracelet. It is important to note that these charging scenarios are only examples and should not be read to limit the scope of the present disclosure.

In at least one alternative embodiment, the electronic device 810 can operate using electrical power supplied by the power supply device and can also charge its battery using this power. When operating with the power from the power supply device, the electronic device can use this power to drive various built-in electronic units. These units may include various power-consuming components as understood to those having ordinary skilled in the art, the details of which are therefore unnecessary to describe here.

In at least one alternative embodiment, the power supply device further includes a cable matched with the power supply device, and the cable is configured to connect the power supply device with the electronic device.

As described above, the power supply device provided by this disclosure can supply electrical power to the electronic device through a reduced volume power supply device. This does not change the internal structure of the electronic device and reduces the space occupied by the power supply device. Consequently, charging an electronic device becomes more convenient.

It should be noted that the circuit control method executed by the power supply device in the above embodiments is illustrated using an example of functional module division. In actual application, functions may be allocated and completed by different functional modules according to requirements. This means that the internal structure of the device can be divided into different functional modules to implement all or some of the contents described above. Additionally, the power supply device and circuit control method provided by the above-mentioned embodiments belong to the same concept. The specific implementation process of the power supply device refers to the method embodiments and details will not be repeated here.

The reference numbers used in the present disclosure are only for description, and do not indicate the advantages or disadvantages of the embodiments.

Those skilled in the art may understand that all or some of the operations of the foregoing embodiments may be implemented by hardware, or may be implemented by instructing related hardware through a software. The program may be stored in a computer-readable storage medium. The storage medium may be a ROM, a magnetic disk, or an optical disc, or the like.

The above descriptions are only exemplary embodiments of the disclosure that can be implemented, but are not intended to limit the disclosure. Any modification, equivalent replacement or improvement, etc. made within the spirit and principles of the disclosure falls within the protection scope of the disclosure.

The invention claimed is:

1. A power supply device, comprising:
an input rectifier circuit configured to convert a received alternating-current voltage into a first pulsating direct-current voltage;
a first-stage conversion circuit connected to the input rectifier circuit, wherein the first-stage conversion circuit is configured to convert the first pulsating direct-current voltage into a second pulsating direct-current voltage;
a valley-fill circuit including an energy storage unit and a first switch unit, the first switch unit being connected to the first-stage conversion circuit and the energy storage unit, and the first switch unit being configured to switch on when the voltage of the energy storage unit is lower than a first voltage value to thereby enable the energy storage unit to obtain electrical power from the first-stage conversion circuit, wherein the energy storage unit is connected to the first-stage conversion circuit, the energy storage unit being configured to supply electrical power when the voltage value of the first pulsating direct-current voltage is lower than a second voltage value to increase a valley voltage of the first pulsating direct-current voltage;
a second-stage conversion circuit connected to the first-stage conversion circuit, wherein the second-stage conversion circuit is configured to convert the second pulsating direct-current voltage into a constant direct-current voltage and output the constant direct-current voltage;
wherein the first voltage value is a preset constant value.

2. The power supply device of claim 1, wherein the first switch unit is configured to switch off when the voltage of the energy storage unit is higher than or equal to the first voltage value.

3. The power supply device of claim 1, wherein the first-stage conversion circuit includes a second switch unit, a voltage transformation unit and a first rectifier unit;
wherein the voltage transformation unit is configured to convert a modulated voltage into an alternating-current input voltage, wherein the modulated voltage is a voltage obtained through chopper processing on the first pulsating direct-current voltage by the second switch unit;
wherein the first rectifier unit is configured to convert the alternating-current input voltage into the second pulsating direct-current voltage.

4. The power supply device of claim 3, wherein the energy storage unit is connected to two terminals of a secondary winding of the voltage transformation unit and configured to obtain electrical power supplied by the voltage transformation unit;
wherein the first switch unit is configured to control a loop between the energy storage unit and the secondary winding to switch on or off,
wherein when the first switch unit controls the loop to switch on, the energy storage unit is configured to obtain electrical power from the voltage transformation unit when the voltage of two terminals of the energy storage unit is lower than the first voltage value.

5. The power supply device of claim 4, wherein the valley-fill circuit further includes a buck circuit, the buck circuit being configured to operate when the first pulsating direct-current voltage is lower than the second voltage value;
wherein the energy storage unit releases stored electrical power through the buck circuit to increase the valley voltage of the first pulsating direct-current voltage when the buck circuit operates.

6. The power supply device of claim 5, wherein the buck circuit includes a diode, a third switch unit, and a filter inductor;
wherein the diode is connected between the filter inductor and a first terminal of the energy storage unit;
wherein the third switch is connected between the filter inductor and a second terminal of the energy storage unit;
wherein the filter inductor is connected between the third switch unit and a first filter capacitor, the first filter capacitor being connected in parallel with an output terminal of the input rectifier circuit.

7. The power supply device of claim 3, wherein the valley-fill circuit further includes a second rectifier unit;
wherein the second rectifier unit is respectively connected to the voltage transformation unit and the first switch unit, the first switch unit being connected to the voltage transformation unit through the second rectifier unit;
wherein the second rectifier unit is configured to rectify alternating-current voltage from the voltage transformation unit into a direct-current voltage, the direct-current voltage being configured to supply electrical power for the energy storage unit.

8. The power supply device of claim 1, wherein the power supply device further comprises a second filter capacitor, the second filter capacitor being connected to an output terminal of the first-stage conversion circuit.

9. The power supply device of claim 8, wherein the input rectifier circuit is connected to an external alternating-current input, the external alternating-current input being configured to input the alternating-current voltage to the power supply device.

10. The power supply device of claim 9, wherein a connection of the input rectifier circuit with the external alternating-current input is either a three-phase port or a two-phase port.

11. The power supply device of claim 8, wherein the second-stage conversion circuit is connected to a first port of a matched cable, the matched cable being configured to supply the constant direct-current power through a second port thereof.

12. The power supply device of claim 11, wherein the first port comprises a universal serial bus (USB) port.

13. The power supply device of claim 11, wherein the matched cable is disposed with a power management chip, the power management chip being configured to manage power of a current flowing through the matched cable.

14. The power supply device of claim 11, wherein the second port comprises one of the following: a Type-C interface, a micro-USB interface and a lightning interface.

15. The power supply device of claim 3, wherein:
the power supply device further comprises a second filter capacitor, the second filter capacitor being connected to an output terminal of the first-stage conversion circuit.

16. A method, of controlling the power supply device of claim 1, comprising:
converting the received alternating-current voltage into a first pulsating direct-current voltage;
converting the first pulsating direct-current voltage into a second pulsating direct-current voltage;
controlling the energy storage unit to obtain electric energy when the voltage of two terminals of the energy storage unit is lower than the first voltage value;
controlling the energy storage unit to provide electrical energy to a circuit port outputting the first pulsating direct-current voltage when the voltage value of the first pulsating direct-current voltage is lower than the second voltage value, to increase the valley voltage of the first pulsating direct-current voltage;
converting the second pulsating direct-current voltage into a constant direct-current voltage and outputting the constant direct-current voltage.

17. A power supply system, comprising:
an electronic device and a power supply device, wherein the power supply device is configured to supply electrical power to the electronic device;
wherein the power supply device comprising an input rectifier circuit, a first-stage conversion circuit, a valley-fill circuit and a second-stage conversion circuit;
wherein the input rectifier circuit is configured to convert a received alternating-current voltage into a first pulsating direct-current voltage;
wherein the first-stage conversion circuit is connected to the input rectifier circuit, and the first-stage conversion circuit is configured to convert the first pulsating direct-current voltage into a second pulsating direct-current voltage;
wherein the valley-fill circuit includes an energy storage unit and a first switch unit, the first switch unit being connected to the first-stage conversion circuit and the energy storage unit, and the first switch unit being configured to switch on when the voltage of the energy storage unit is lower than a first voltage value to thereby enable the energy storage unit to obtain electrical power from the first-stage conversion circuit, wherein the energy storage unit is connected to the first-stage conversion circuit, the energy storage unit being configured to supply electrical power when the voltage value of the first pulsating direct-current voltage is lower than a second voltage value to increase a valley voltage of the first pulsating direct-current voltage;
wherein the second-stage conversion circuit is connected to the first-stage conversion circuit, and the second-stage conversion circuit is configured to convert the second pulsating direct-current voltage into a constant direct-current voltage and output the constant direct-current voltage;
wherein the first voltage value is a preset constant value.

18. The power supply system of claim 17, wherein one or more of the following:
the electronic device is configured to store the electrical power supplied by the power supply device in a battery; and
the electronic device is configured to drive, through the electrical power supplied by the power supply device, an electronic unit therein to work.

19. The power supply system of claim 17, wherein the power supply system further includes a cable matched with the power supply device, the cable being configured to connect the power supply device to the electronic device.

* * * * *